(12) United States Patent
Underland et al.

(10) Patent No.: US 10,501,140 B2
(45) Date of Patent: Dec. 10, 2019

(54) TWO-WHEELED VEHICLE

(71) Applicant: Indian Motorcycle International, LLC, Medina, MN (US)

(72) Inventors: Kent A. Underland, Coon Rapids, MN (US); Nicholas J. Schafer, Taylor Falls, MN (US); Eric J. Fuchs, Blaine, MN (US); Keith Steidl, Blaine, MN (US); Tyson Anderson, Lindstrom, MN (US); Tal G. Swenson, Scandia, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/723,745

(22) Filed: Oct. 3, 2017

(65) Prior Publication Data
US 2019/0023346 A1 Jan. 24, 2019

Related U.S. Application Data

(60) Provisional application No. 62/403,310, filed on Oct. 3, 2016.

(51) Int. Cl.
*B62K 11/04* (2006.01)
*B62J 17/02* (2006.01)
*B62J 33/00* (2006.01)
*B62M 7/06* (2006.01)

(52) U.S. Cl.
CPC .............. *B62K 11/04* (2013.01); *B62J 17/02* (2013.01); *B62J 33/00* (2013.01); *B62M 7/06* (2013.01)

(58) Field of Classification Search
CPC ........... B62K 11/04; B62J 17/02; B62J 33/00; B62M 7/06
See application file for complete search history.

(56) References Cited

U.S. PATENT DOCUMENTS

| 4,445,587 A | 5/1984 | Hillman |
| 4,703,825 A * | 11/1987 | Mikami ................. B62J 17/00 123/41.7 |
| 6,105,701 A | 8/2000 | Buell |

(Continued)

FOREIGN PATENT DOCUMENTS

| EP | 1564390 | 8/2005 |
| JP | H07187041 | 7/1995 |
| WO | WO 2018/067555 | 4/2018 |

OTHER PUBLICATIONS

International Search Report, issued by the International Searching Authority, dated Jan. 8, 2018, for International Patent Application No. PCT/US2017/054923; 4 pages.

(Continued)

*Primary Examiner* — Joseph M Rocca
*Assistant Examiner* — Marlon A Arce
(74) *Attorney, Agent, or Firm* — Faegre Baker Daniels LLP

(57) ABSTRACT

A two-wheeled vehicle includes a frame, a plurality of ground-engaging members for supporting the frame, and an engine supported by the frame and operably coupled to the ground-engaging members. Additionally, the frame includes a main frame portion having an air inlet at a front side thereof, an air duct extending through the main frame portion, and at least one air outlet at a rear side thereof, whereby the air outlets exhaust air from the air duct to cool the rider.

16 Claims, 19 Drawing Sheets

(56) References Cited

U.S. PATENT DOCUMENTS

| | | | |
|---|---|---|---|
| 7,658,395 | B2 | 2/2010 | Bagnariol |
| 7,669,682 | B2 | 3/2010 | Holroyd |
| 7,748,746 | B2 | 7/2010 | Hoeve |
| 7,832,516 | B2 | 11/2010 | Bagnariol |
| 8,590,654 | B2 | 11/2013 | Kerner |
| 9,216,789 | B2 | 12/2015 | Hamlin |
| 9,381,803 | B2 | 7/2016 | Galsworthy |
| 9,394,859 | B2 | 7/2016 | Parnofiello |
| 9,421,860 | B2 | 8/2016 | Schuhmacher |
| 10,023,264 | B2 * | 7/2018 | Hayslett ............ B62M 6/80 |
| 2005/0126184 | A1 * | 6/2005 | Cauchy ............. F25B 21/02 62/3.3 |
| 2005/0178598 | A1 * | 8/2005 | Arnold ............. B62J 17/00 180/229 |
| 2008/0169134 | A1 * | 7/2008 | Tomolillo .......... B60J 1/04 180/6.24 |
| 2014/0131128 | A1 * | 5/2014 | Schuhmacher ...... B62J 17/04 180/219 |
| 2014/0367183 | A1 * | 12/2014 | Matsuda ............ B62K 11/04 180/220 |
| 2015/0008053 | A1 * | 1/2015 | Matsuda ............ B62K 11/04 180/65.1 |
| 2015/0130209 | A1 * | 5/2015 | Hamlin ............. B62J 17/02 296/78.1 |

OTHER PUBLICATIONS

Written Opinion of the International Searching Authority, dated Jan. 8, 2018, for International Patent Application No. PCT/US2017/054923; 5 pages.

International Preliminary Report on Patentability issued by the International Bureau of WIPO, dated Apr. 9, 2019, for International Patent Application No. PCT/US2017/054923; 6 pages.

\* cited by examiner

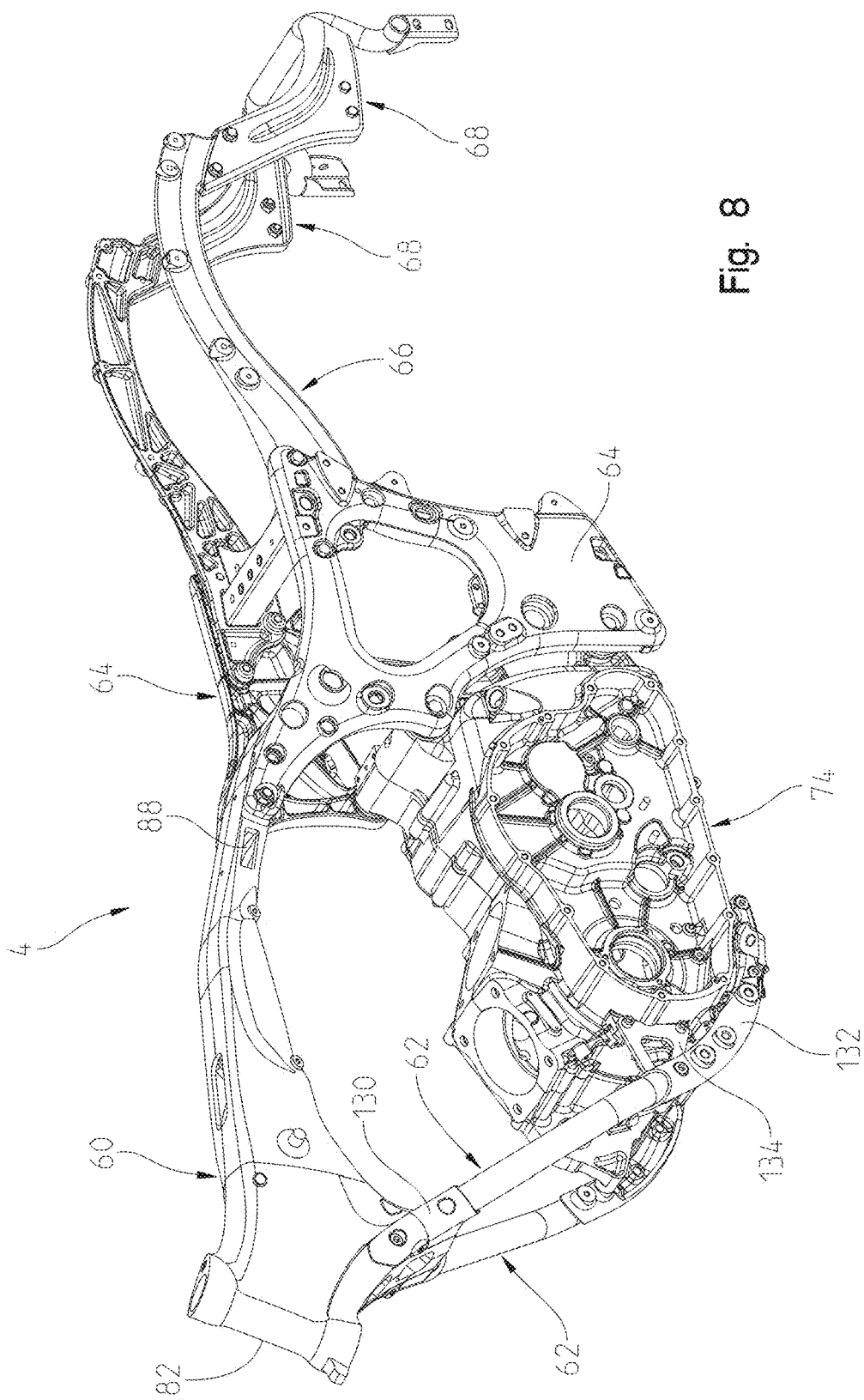

TWO-WHEELED VEHICLE

RELATED APPLICATIONS

The present application claims priority to provisional patent application Ser. No. 62/403,310 filed Oct. 3, 2016, the subject matter of which is incorporated herein by reference.

BACKGROUND OF THE INVENTION

The present disclosure relates to a two-wheeled vehicle and, more particularly, to a motorcycle having added rider comfort, such as improved cooling of the engine to lower rider heat.

Conventional two-wheeled vehicles include a frame for supporting an operator. The frame may also support a passenger rearward of the driver. An engine is typically positioned below the driver and is coupled to the frame. It is common that the heat from the engine and or exhaust system collects to form a hot air pocket, which is uncomfortable for the rider particularly at low speeds.

SUMMARY OF THE INVENTION

In an exemplary embodiment of the present invention, a two-wheeled vehicle comprises a frame; a plurality of ground-engaging members for supporting the frame; an engine supported by the frame and operably coupled to the ground-engaging members; the frame including a main frame portion having an air inlet at a front side thereof, an air duct extending through the main frame portion, and at least one air outlet at a rear side thereof, whereby the air outlets exhaust air from the air duct to cool the rider.

The two-wheeled vehicle may have the at least one air outlet comprising an air outlet which opens downwardly onto a top of the engine. The two-wheeled vehicle may have the at least one air outlet comprising two air outlets which open laterally outwardly to exhaust onto the rider's legs. The two-wheeled vehicle may further comprise a fan mounted internally of the duct to pull air in through the air inlet. The fan may be operated based on vehicle speed. The fan may be operated based on at least one temperature point around the vehicle.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 8 is left side perspective view of a frame for the vehicle of FIG. 1;

Corresponding reference characters indicate corresponding parts throughout the several views. Unless stated otherwise the drawings are proportional.

DETAILED DESCRIPTION OF THE DRAWINGS

Figure 1:
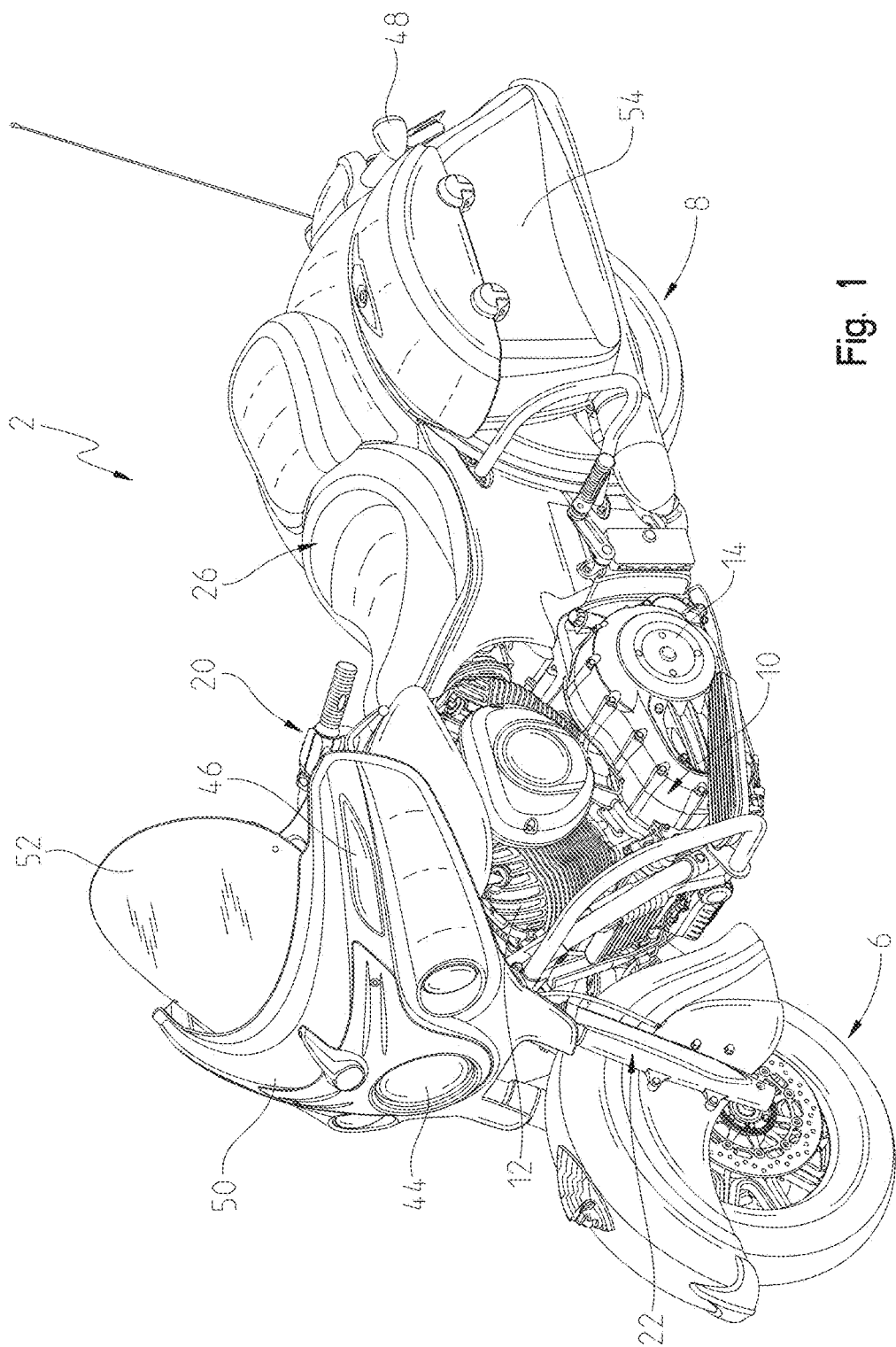
FIG. 1 is a left front perspective view of the two-wheeled vehicle.
Figure 2:
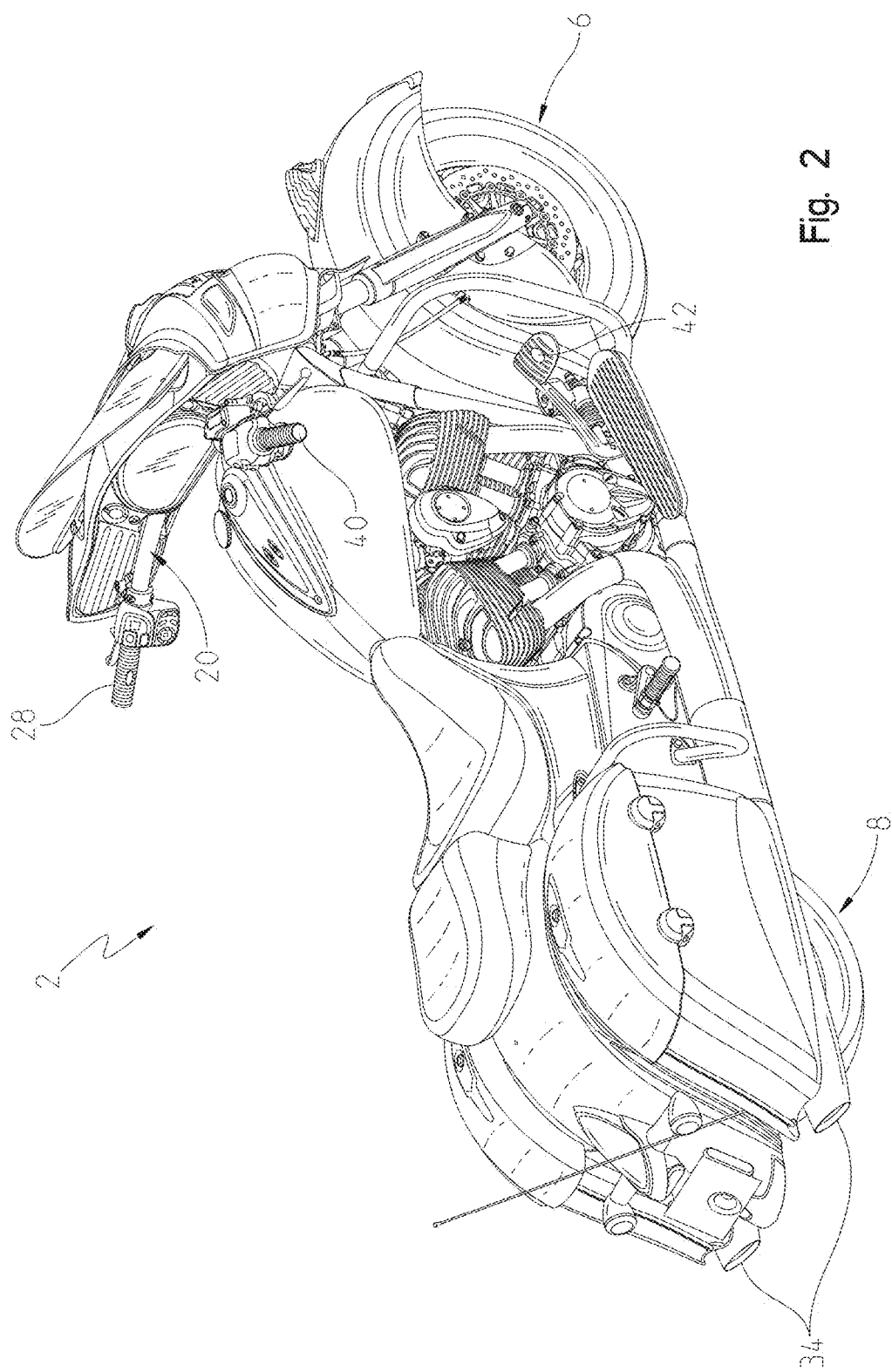
FIG. 2 is a right rear perspective view of the two-wheeled vehicle.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

With reference first to FIGS. 1-7, an illustrative embodiment of a two-wheeled vehicle 2 is shown. Vehicle 2 as illustrated is a touring style motorcycle although the majority of components may be used for a cruiser style motorcycle as described herein. Vehicle 2 may also include any features known from U.S. Pat. No. 7,832,516, entitled "TWO-WHEELED VEHICLE", the disclosure of which is expressly incorporated by reference herein.

U.S. Pat. No. 7,748,746 entitled "FUEL TANK ARRANGEMENT FOR A VEHICLE," U.S. Pat. No. 7,669,682 entitled "REAR SUSPENSION FOR A TWO WHEELED VEHICLE"; U.S. Pat. No. 7,658,395 entitled "TIP OVER STRUCTURE FOR A TWO WHEELED VEHICLE"; U.S. Pat. No. 9,216,789 entitled "TWO-WHEELED VEHICLE"; U.S. Pat. No. 9,381,803 entitled "TWO-WHEELED VEHICLE"; U.S. Pat. No. 9,421,860 entitled "TWO-WHEELED VEHICLE"; and U.S. Pat. No. 9,394,859 entitled "TWO-WHEELED VEHICLE", are also expressly incorporated by reference herein.

Vehicle 2 includes a frame 4 (FIG. 3) supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In the illustrated embodiment, engine 12 is a 50° V-twin spark-ignition gasoline engine available from Polaris Industries, Inc. located at 2100 Highway 55 in Medina, Minn. 55340. In alternative embodiments, rear wheel 8 is coupled to the drive shaft through a chain drive or other suitable couplings. The drive arrangement in the illustrated embodiment is comprised of a six speed overdrive constant mesh transmission with a carbon fiber reinforced belt available from Polaris Industries Inc. In alternative embodiments, the transmission is a continuous variable transmission.

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Figure 6:
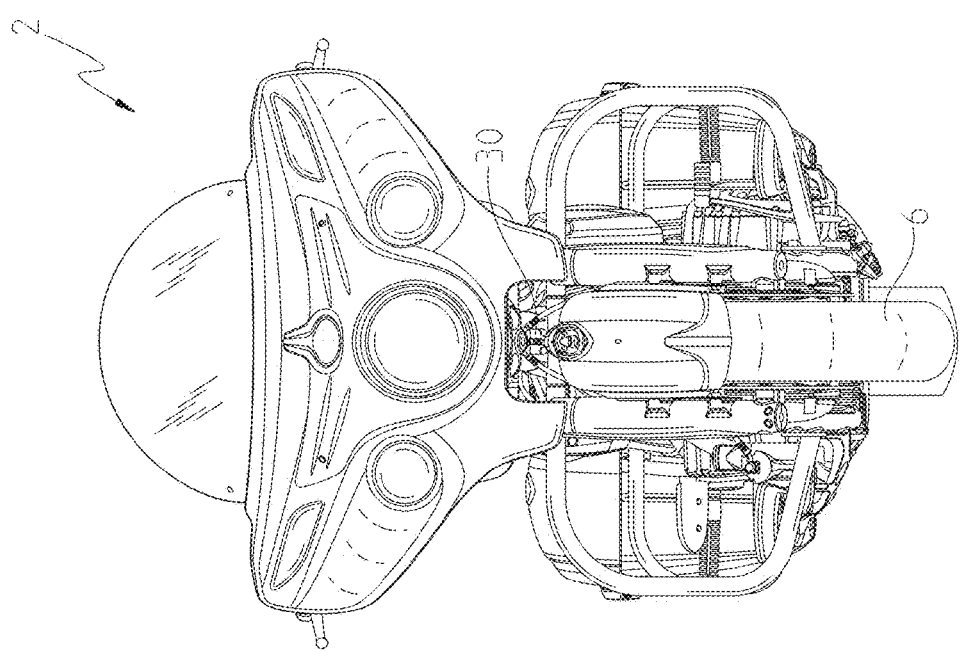
FIG. 6 is a front view of the two-wheeled vehicle of FIG. 1.
Figure 9:
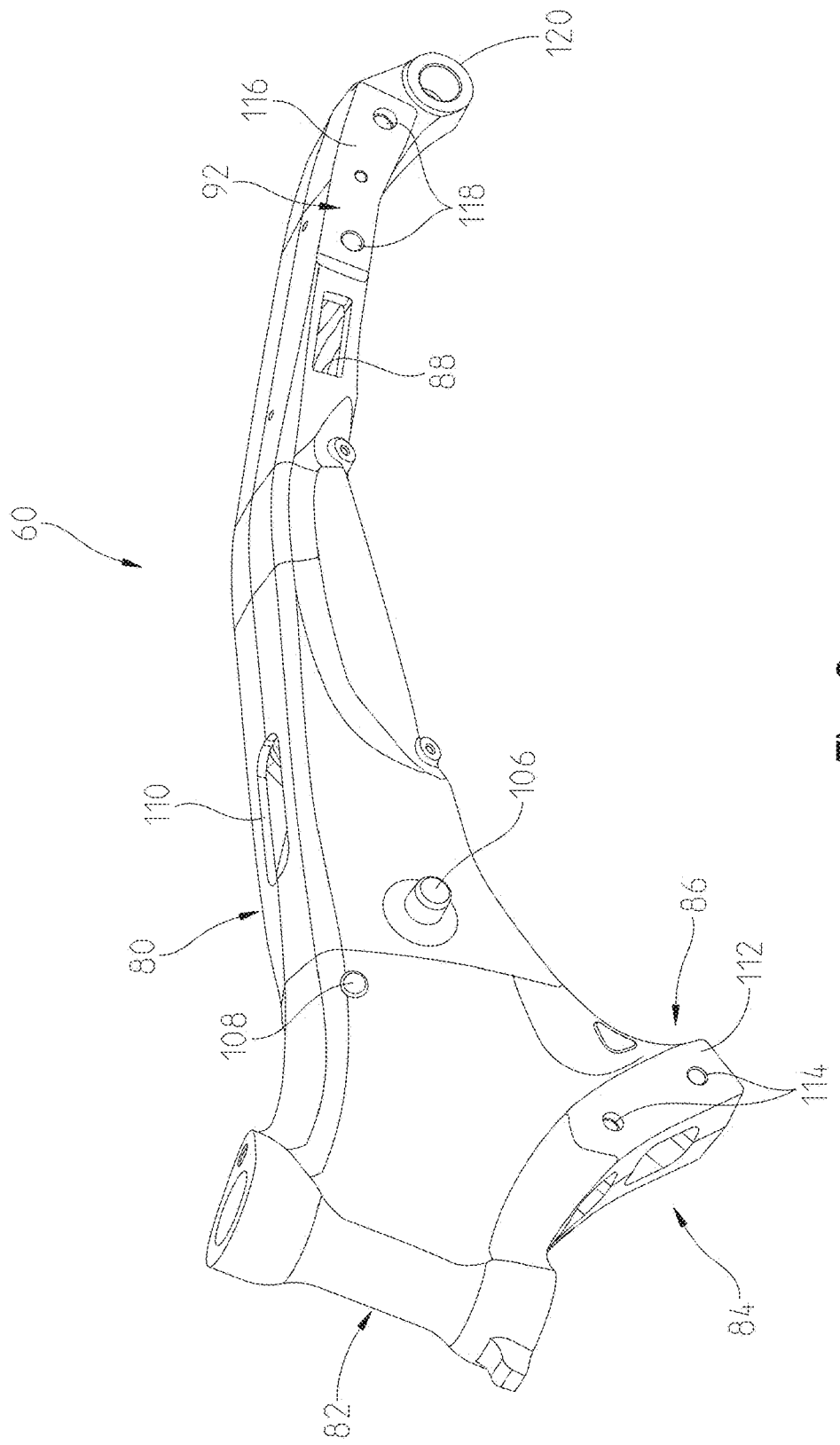
FIG. 9 is a left side perspective view of a main frame portion of the frame of FIG. 8.
Figure 10:
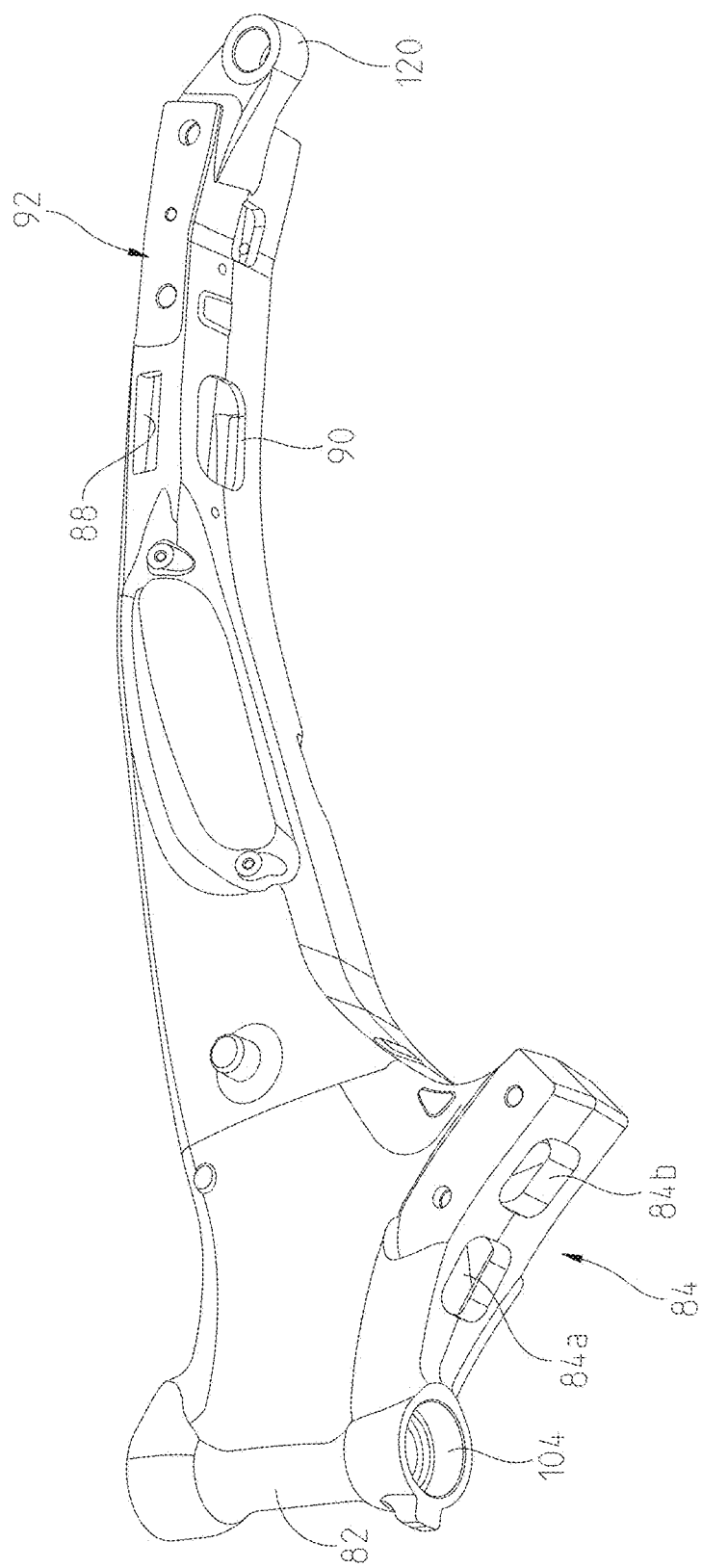
FIG. 10 is an underside perspective view of the main frame portion shown in FIG. 8.
Figure 11:
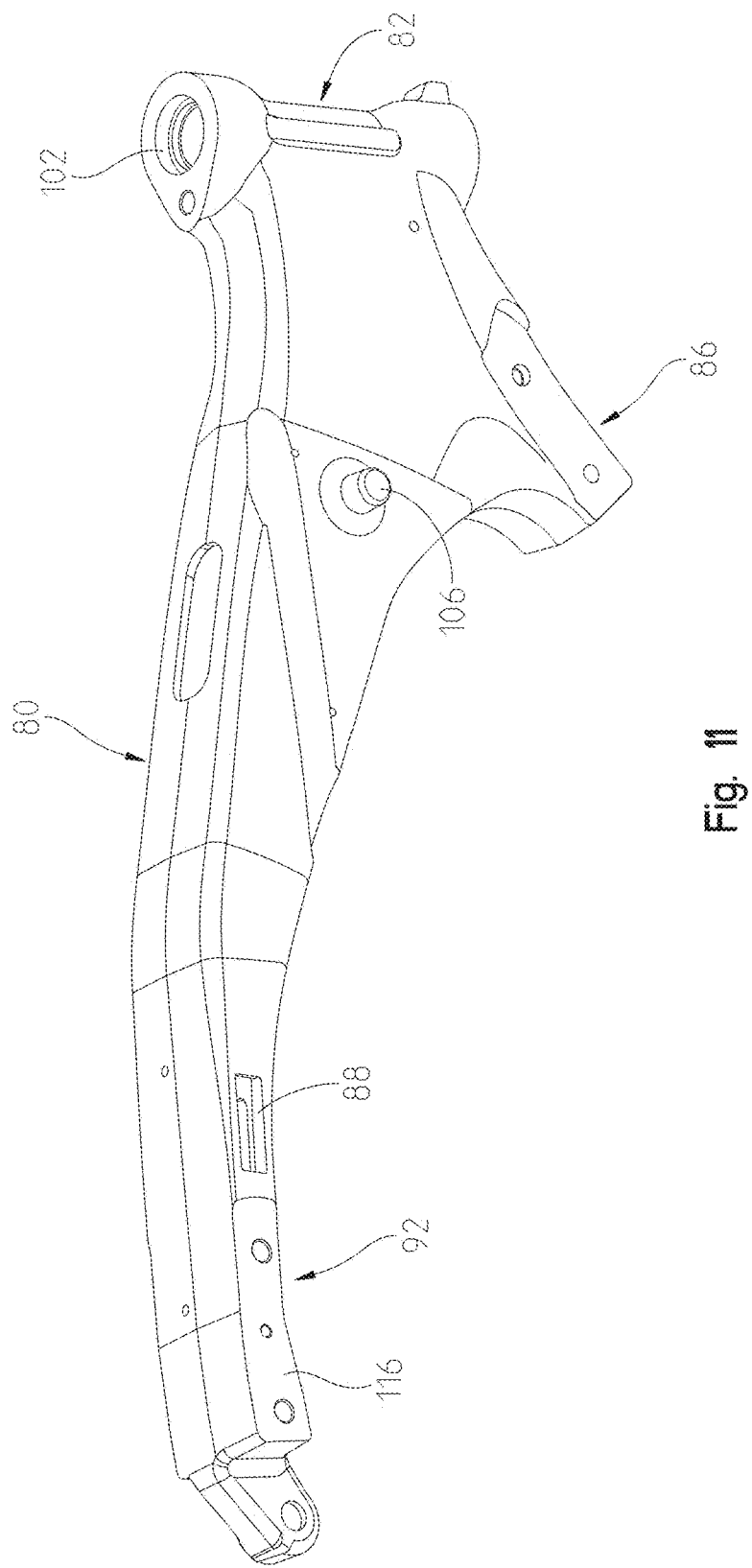
FIG. 11 is a right hand side perspective view of the main frame portion shown in FIG. 8.

Motorcycle 2 also generally includes a steering assembly 20, front suspension 22, rear suspension 24 (FIG. 3), and seat 26. Steering assembly 20 includes handlebars 28 which may be moved by an operator to rotate front wheel 6 either to the left or the right, where steering assembly is coupled to the motorcycle through triple clamp assembly 30 (FIG. 6). Engine operating systems are also included such as an air intake system 32 and exhaust system 34. Operator controls are also provided for operating and controlling vehicle 2, which may include vehicle starting system 36 (FIG. 5), vehicle speed controls 40 (FIG. 2) and vehicle braking systems 42. Safety systems may also be provided such as main lighting 44, front turn signals 46, and rear turn signals 48. Ergonomic systems may include front fairing 50, windshield assembly 52 and saddlebag assembly 54.

With reference now to FIGS. 8-12, motorcycle frame 4 will be described in greater detail. With reference first to FIG. 8, frame 4 is comprised of main frame portion 60, front frame tubes 62, side frames 64, frame extension portions 66, and rear frame portion 68. As shown in FIG. 8, frame 4 is coupled to power train housing 74 and power train housing 74 becomes an integral part of frame 4 as described herein. Frame 4 is more fully described in U.S. Pat. No. 9,421,860, the subject matter of which is incorporated herein by reference. With reference now to FIGS. 9-12, main frame portion 60 will be described in greater detail.

Figure 12:
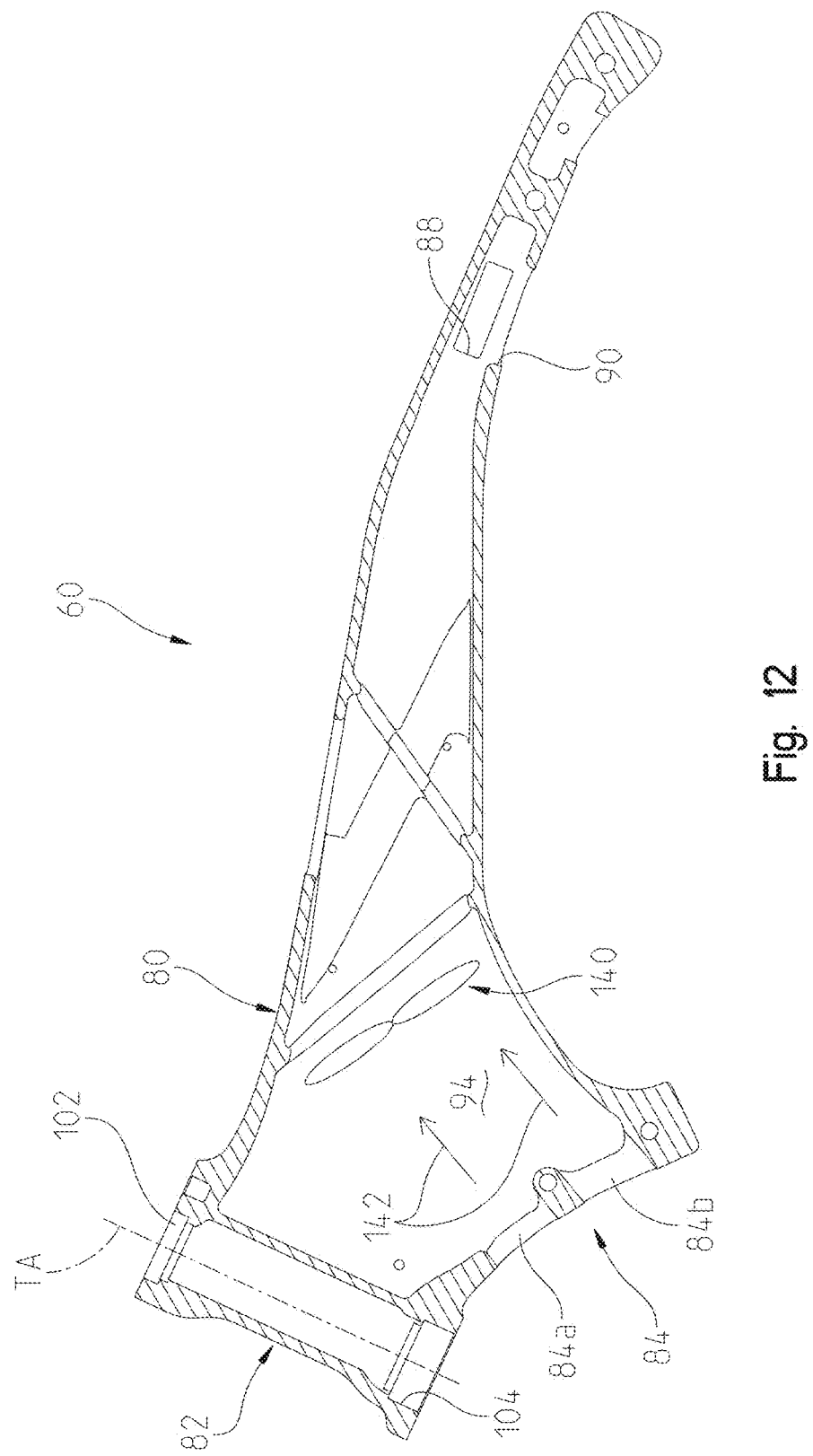
FIG. 12 shows a longitudinal cross-section of the main frame portion.

Main frame portion 60 includes a generally cast body of uniform construction. Main frame portion 60 may include any of the features of U.S. Pat. No. 7,779,950, the disclosure of which is incorporated herein by reference. Main frame portion 60 includes a body portion shown at 80 and generally includes head tube 82, air inlet 84, mounting brackets 86, air outlets 88, 90 and mounting flange 92. As shown in FIG. 12, which is a longitudinal section of main frame portion 60, it is shown that main frame portion 60 is generally hollow to include an integral duct at 94, such that air can be drawn through air intake ports 84a and 84b of air intake 84, and flow rearwardly into the air duct 94 (left-to-right as viewed in FIG. 12) toward air outlets 88 and 90, as described further herein.

As shown in FIG. 12, head tube 82 extends at a rake angle for a touring motorcycle having an angle "TA" relative to horizontal. As is known, head tube 82 includes circular bores 102 and 104 to house bearings for a steering system described herein. With reference again to FIG. 9, body portion 80 also comprises mounting pegs 106, 108, and opening 110. Mounting bracket 86 includes a planar mounting surface 112 having threaded apertures 114 while bracket 82 includes a planar surface 116 having threaded apertures 118. Finally, main frame portion 60 includes a mounting boss 120 at an opposite end having aperture at 122 as described herein.

With reference again to FIG. 8, frame tubes 62 include upper frame couplers 130 and lower tube couplers 132. It should be understood that couplers 130 and 132 may be cast members adhesively fixed to tube portions 62 in a similar manner described in U.S. Pat. No. 8,590,654 "SNOWMOBILE", the subject matter of which is incorporated herein by reference. As shown in FIG. 8, frame 4 also comprises a coupling plate 134 having mounting apertures for mounting power train housing 74 thereto. Side frames 64 couple between main frame portion 60, power train housing 74, and frame extension portions 66. The final assembly is shown best in FIG. 8.

Figure 3:
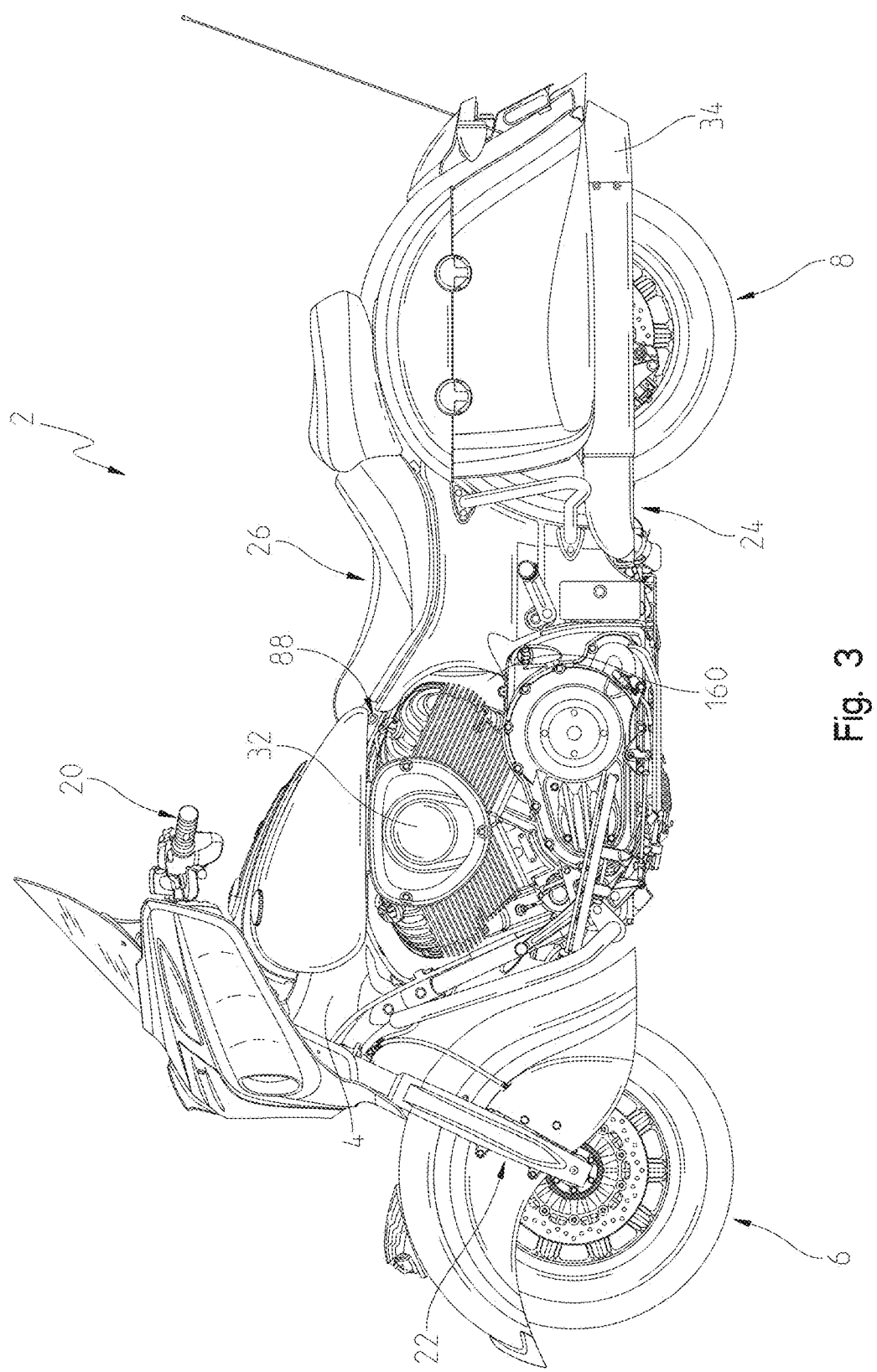
FIG. 3 is a left side view of an illustrative embodiment of the two-wheeled vehicle.
Figure 4:
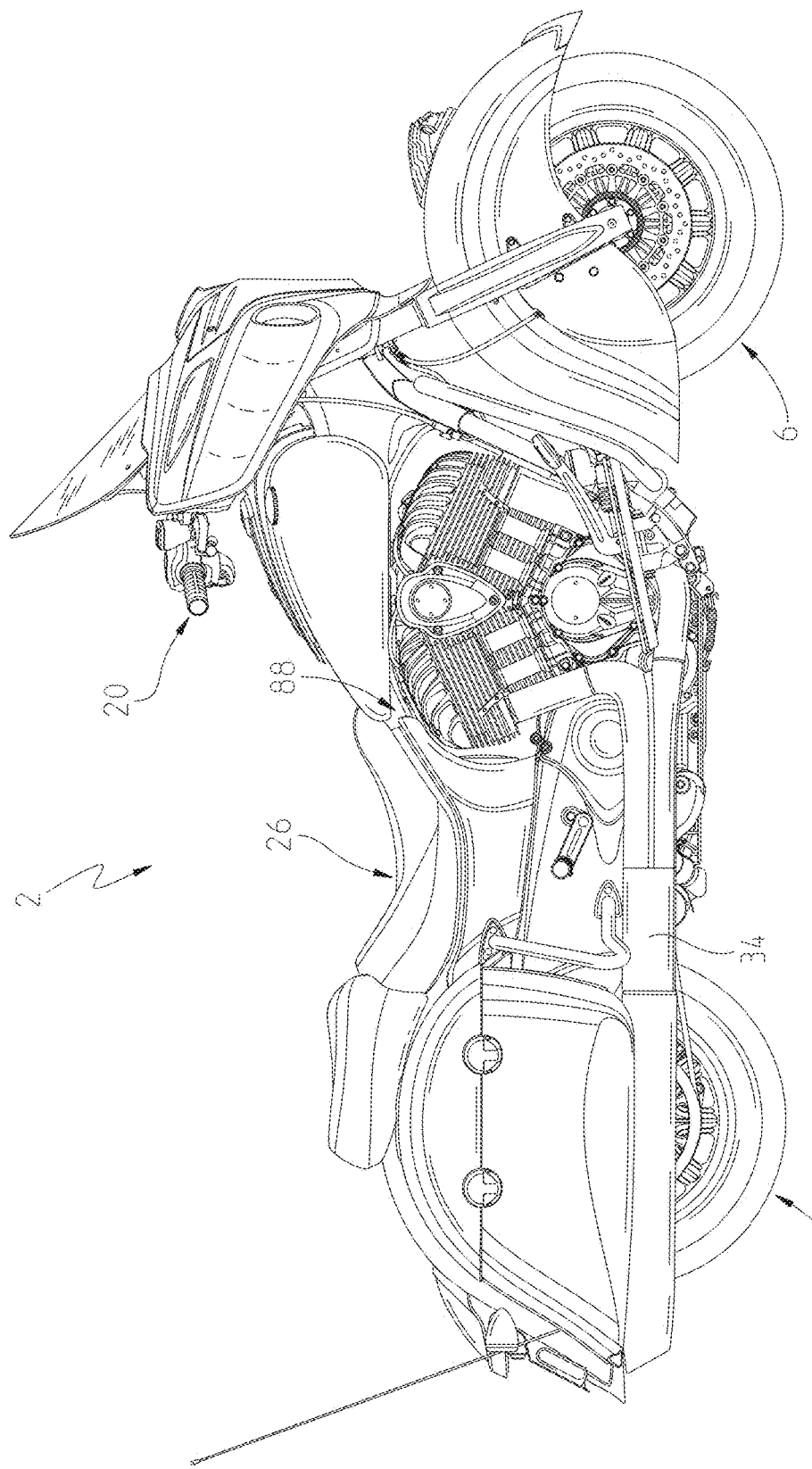
FIG. 4 is a right side view of an illustrative embodiment of the two-wheeled vehicle.
Figure 5:
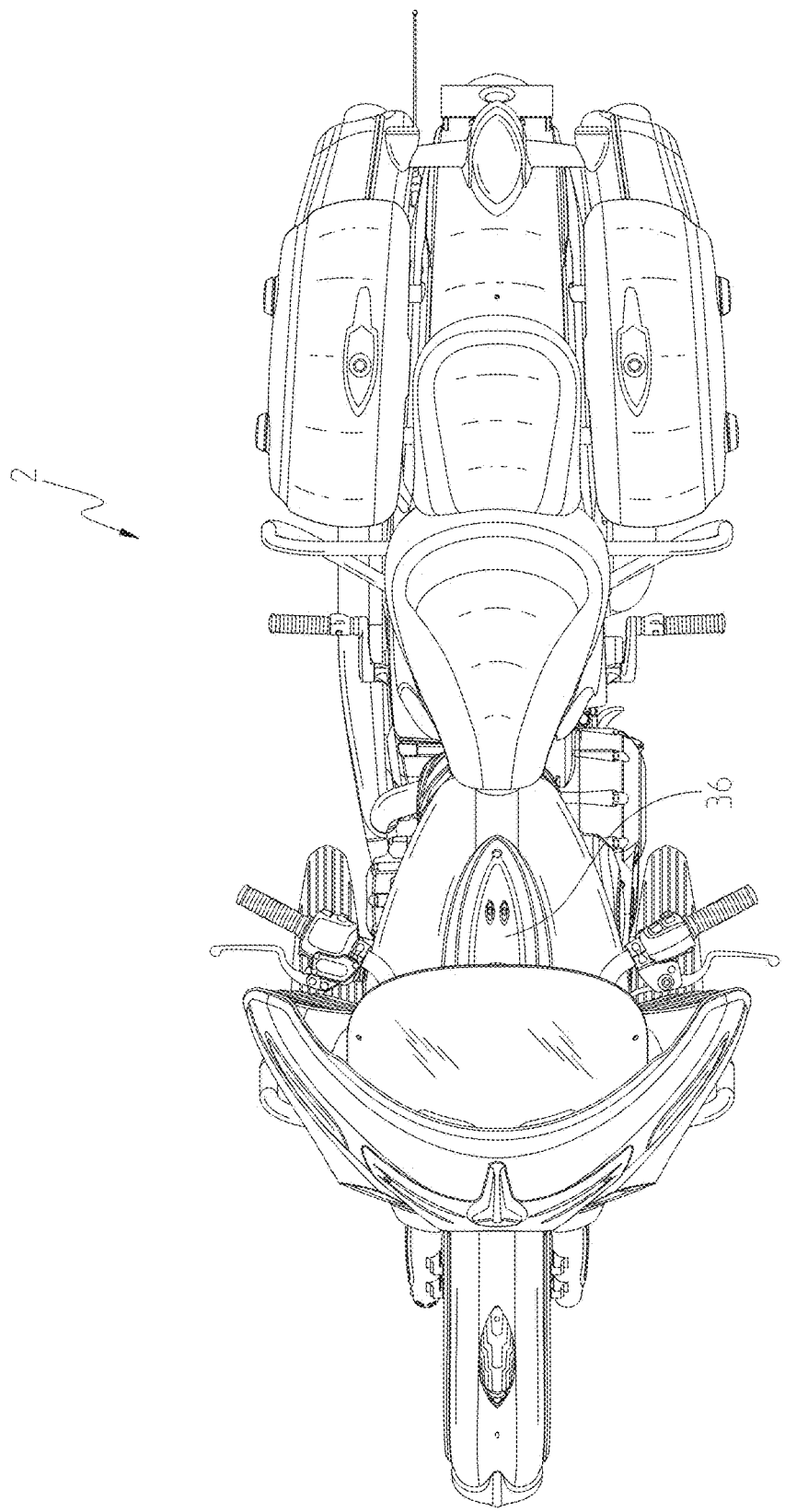
FIG. 5 is a top view of the two-wheeled vehicle of FIG. 1.
Figure 7:
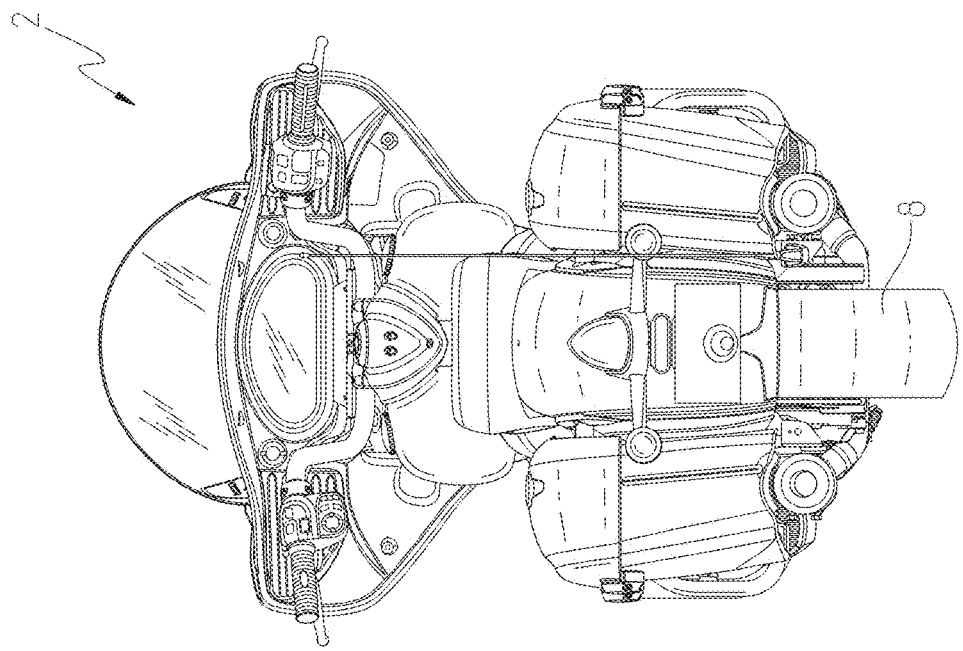
FIG. 7 is a rear view of the two-wheeled vehicle of FIG. 1.

As assembled, and as shown in FIG. 8, air outlet 90 (FIG. 10) is directed downwardly towards powertrain housing 74. As shown in FIGS. 3 and 4, air outlets 88 are directed outwardly. As shown in FIG. 4, the main frame portion extends rearwardly to a position where the two air outlets 88 extend to a position under a front of the seat 26. This airflow is intended to break up the hot air pocket which is formed by the engine heat which is trapped under the rider's thigh and behind the rider's calf as the rider is seated on the motorcycle. This heat emanates from the stall point at 160 (see FIG. 3) and comes outwardly to form the hot air pocket. The hot air pocket is larger when the vehicle is not moving or is moving slowly, as the vehicle movement causes airflow around the vehicle, cooling both the hot air pocket and the rider's legs.

Figure 14:
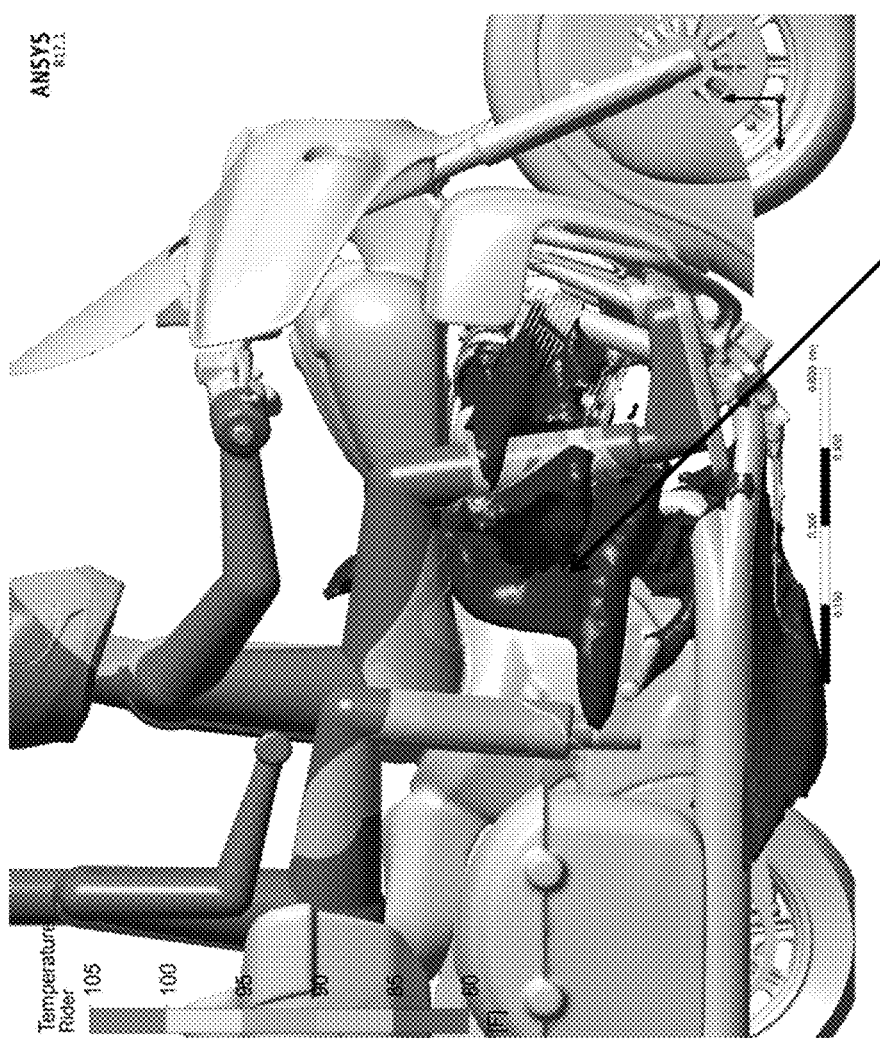
FIG. 14 shows an isosurface depiction of the hot air pocket when the vehicle speed is 80 mph.

As shown in FIG. 14, an isosurface depiction of the hot air pocket is shown when the vehicle speed is 80 mph. As can be seen, the hot air pocket is positioned below the rider's thigh and against the rider's calf. This is shown prior to the addition of the through frame cooling. After adding the through frame cooling, the rise over ambient is shown below in Table for 80 mph. All of the locations are cooler, with the greatest improvement being at the rider's right calf.

TABLE 1

| | Max Rise Over Ambient (F.) | | | |
|---|---|---|---|---|
| | Left Calf | Right Calf | Left Thigh | Right Thigh |
| Baseline | 17 | 41 | 25 | 27 |
| Frame Holes | 15 | 36 | 24 | 26 |

Figure 15:
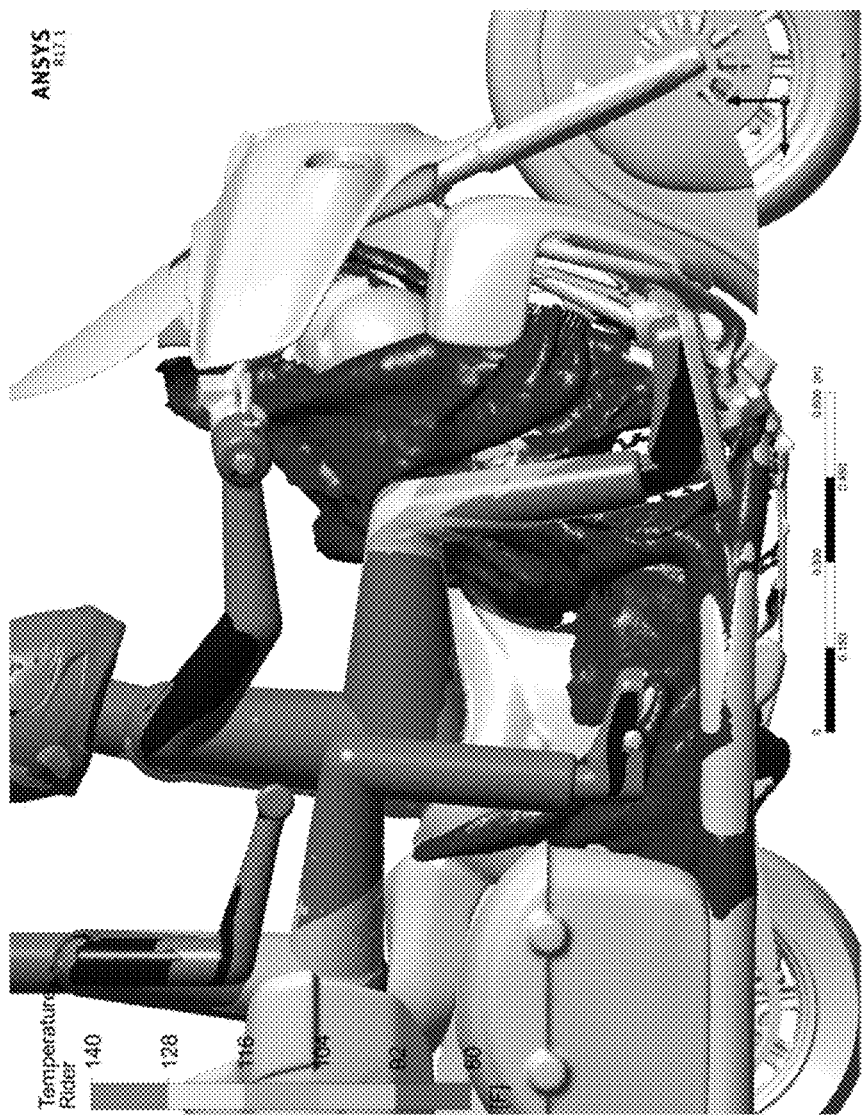
FIG. 15 shows an isosurface depiction of the hot air pocket when the vehicle speed is 1 mph.

As shown in FIG. 15, an isosurface depiction of the hot air pocket is shown when the vehicle speed is 1 mph. As can be seen, the hot air pocket is positioned below the rider's thigh and against the rider's calf as well as in front of the rider's legs. This is shown prior to the addition of the through frame cooling.

After adding the through frame cooling, the rise over ambient is shown below in Table 2 for 1 mph. All of the locations are cooler (with the exception of the right thigh), with the greatest improvement being at the rider's right calf, showing a change in temperature ($\Delta T$) of 20° F.

TABLE 2

| | Max Rise Over Ambient (F.) | | | |
| --- | --- | --- | --- | --- |
| | Left Calf | Right Calf | Left Thigh | Right Thigh |
| Baseline | 67 | 97 | 67 | 59 |
| Frame Holes | 64 | 76 | 64 | 71 |

Figure 13:
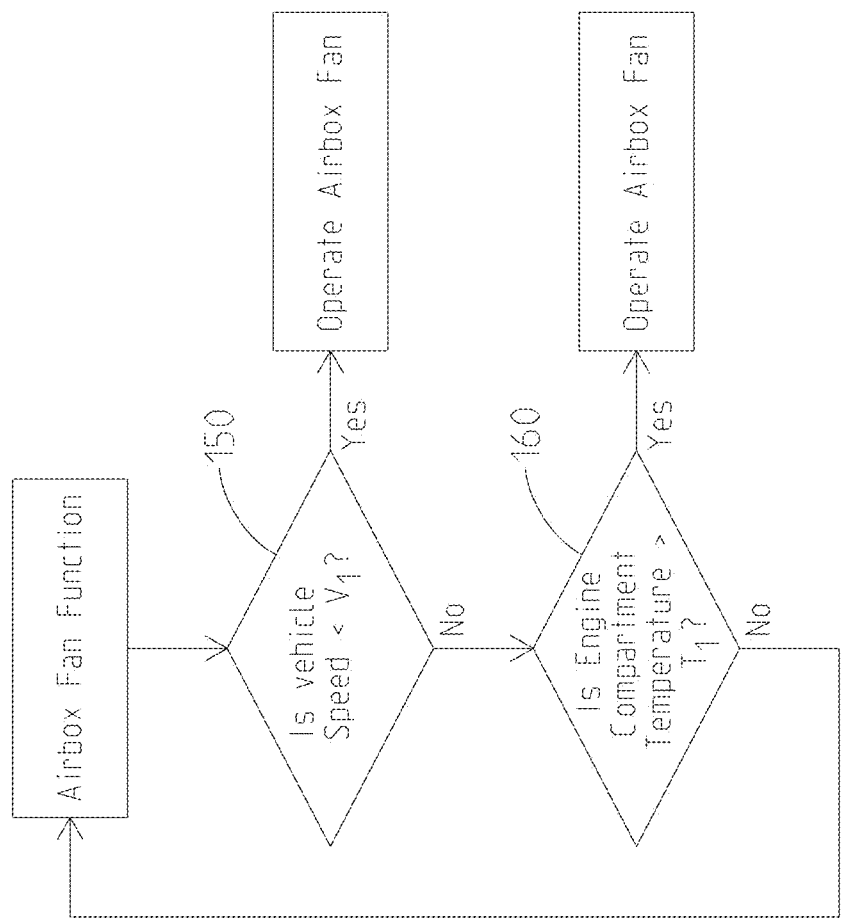
FIG. 13 shows a schematic flowchart of the electronically controlled fan.

As shown in FIG. 12, an electronically controlled fan 140 is placed within the duct 94 such that air is drawn into the duct 94 in the direction of arrows 142. The fan 140 could be activated by vehicle ground speed, by temperature or by a combination of both speed and temperature. The fan speed could also be variably proportional to the speed or temperature. For example, and with reference to FIG. 13, the fan function is shown in a flowchart where at step 150, the vehicle speed is measured and compared to a reference speed $V_1$. If the speed is less than $V_1$, the fan is operated. In the present embodiment, $V_1$ is in a range 0-40 mph, and more particularly in a range of 0-20 mph. The process could also include providing temperature readings at various points for example at 160 (FIG. 3) or adjacent to the rider's legs where the heat pocket exists, where the temperature reading is $T_1$. The temperature sensed could also be the engine skin temperature.

Thus, either of the vehicle speed or temperature could be read by sensors which input their value to a control unit, which could be a separate unit solely for the fan, or could be an engine control unit or vehicle control unit that uses the inputs from to start the fan. As mentioned above the fan speed could be proportional to the value of the vehicle speed or temperature. For example, the fan speed could be inversely proportional to the vehicle speed, such that, by example when the vehicle is below 5 mph, the fan operates at full capacity, whereas when the vehicle speed is between 30-40 mph the fan speed is operated at 25% capacity. Temperature on the other hand would be directly proportional to fan speed, such that the higher the temperature, the higher the fan speed. It would also be possible to include air directional or air constricting devices on the main frame portion. For example, vanes or louvers could be provided over the air outlets 88 to direct the air directionally to suit the rider's comfort. Louvers could also be placed over the air outlet 90 to increase the air flow through the air outlets 88.

Figure 16:
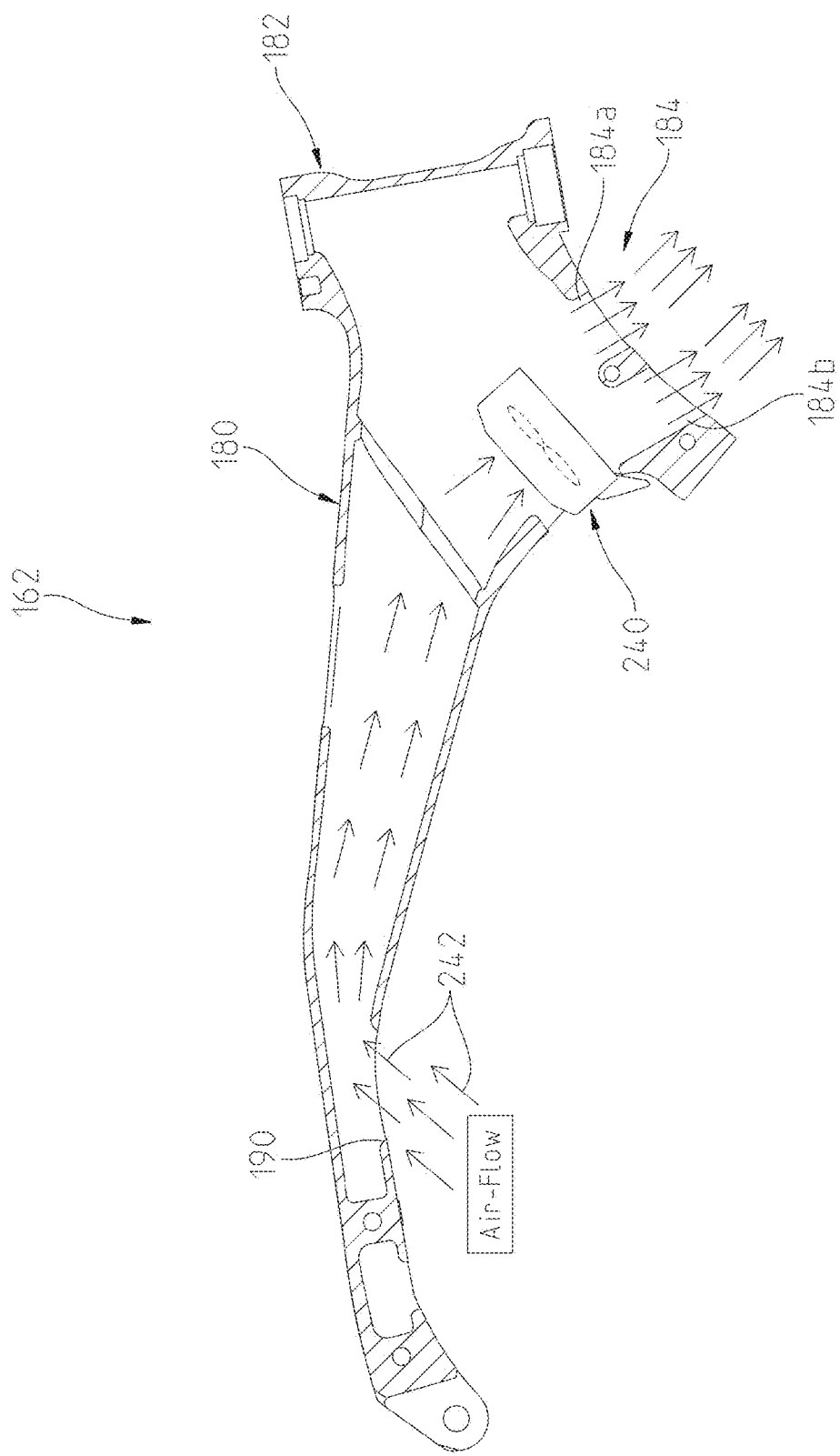
FIG. 16 is an alternate air flow path of the embodiment of FIG. 12.
Figure 17:
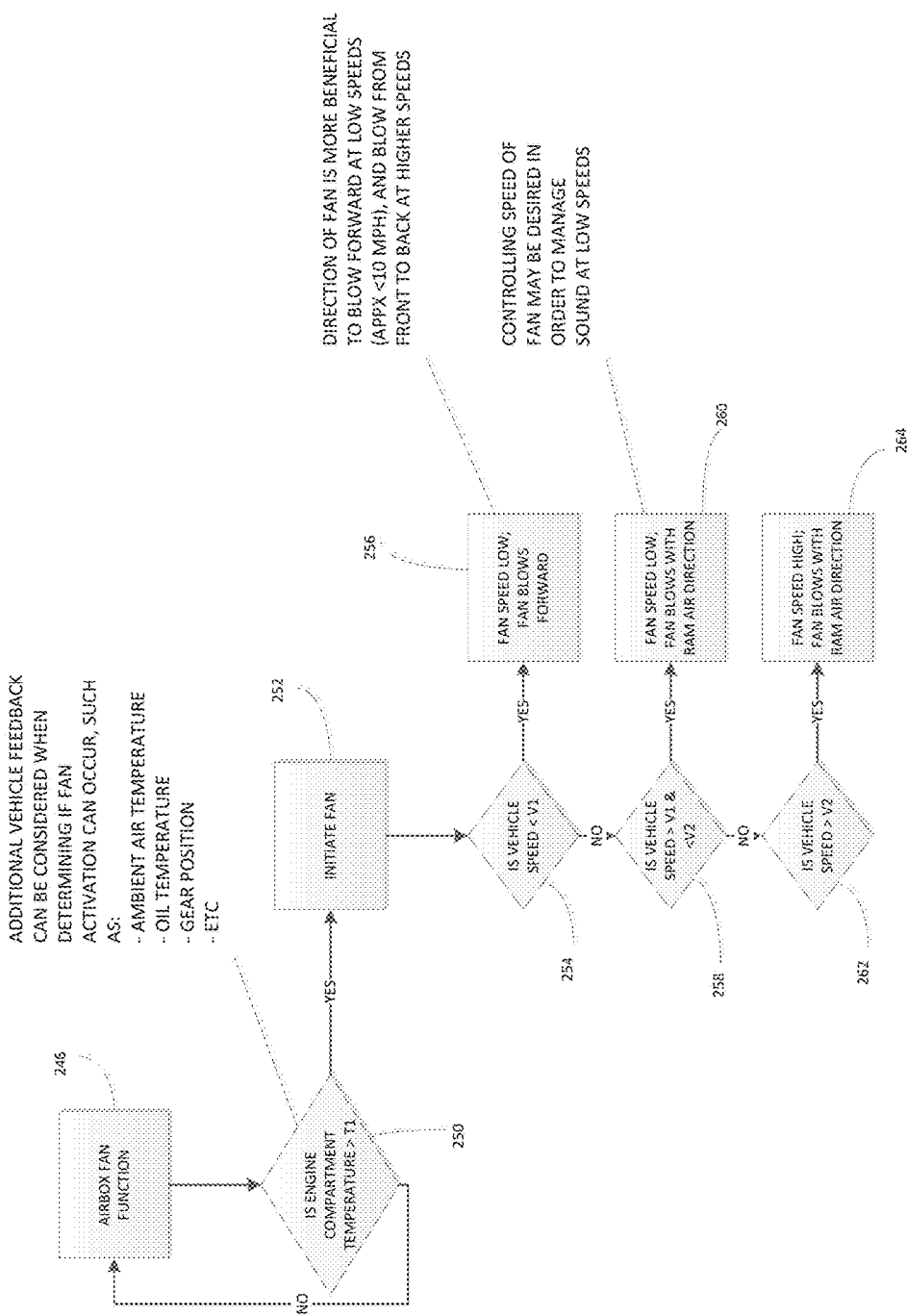
FIG. 17 shows a schematic flowchart of the electronically controlled fan shown in FIGS. 12 and 16.

With reference now to FIGS. 16 and 17, an alternate embodiment to the embodiment shown in FIG. 12 will be described. With reference first to FIG. 16, a main frame portion 162 is shown which is substantially similar to main frame portion 60 shown in FIG. 12. Main frame portion 162 includes head tube 182, and air inlet 184 comprised of upper and lower air inlets 184A and 184B. Main frame portion 162 further includes an opening at 190 where in this embodiment, opening 90 may act as an air inlet or an air outlet. Main frame portion 162 further includes a fan 240, where fan 240 is a bidirectional fan which in one condition may draw air into openings 184A, 1846 (as in the embodiment of FIG. 12). Or in another condition, can draw air through opening 190 drawing hot air away from the rider in the direction of arrows 242 in FIG. 16, whereby the hot air is exhausted through openings 184A and 184B as shown in FIG. 16.

With reference now to FIG. 17, the control of fan 240 will be described. As shown, the air box fan function is shown at 246 and may be operated in conjunction with a vehicle control until, an engine control until or may be a separate control unit with the fan 240. At step 250, the engine compartment temperature is measured to determine if the temperature is greater than a preset temperature $T_1$, where $T_1$ is either the cylinder head temperature or air manifold temperature. Additional sensors could be added in place of these if desired. Additional vehicle feedback can be used in combination with the engine compartment temperature or as an alternative to engine compartment temperature, and could include ambient air temperature, oil temperature or transmission gear position. If the engine compartment temperature is greater than $T_1$, the fan is initiated at step 252.

Once the fan operation is initiated, further steps are provided to determine the fan speed and the fan direction. At step 254, the vehicle speed is measured to determine if the speed is less than $V_1$. If so, at step 256, the fan speed is set at a low speed and the fan blows in the direction of FIG. 16 forwardly through the openings 184A and 184B. This pulls hot air away from the rider's legs while at slow speed. At step 258, the vehicle speed is measured to determine if the speed is greater than $V_1$ and less than $V_2$. If so, the fan speed is operated at a low speed but the fan blows in the direction of the ram air, that is, in the direction of arrows 142 in FIG. 12. At step 262, the vehicle speed is measured to see if the speed is greater than $V_2$ and if so, the fan speed is operated at a high speed in the direction of arrows 142 as shown in FIG. 12. In the embodiment shown, $V_1$ is approximately 10 mile per hour (mph) and $V_2$ is in a range between 15-35 mph, and preferably 20-30 mph.

Figure 18:
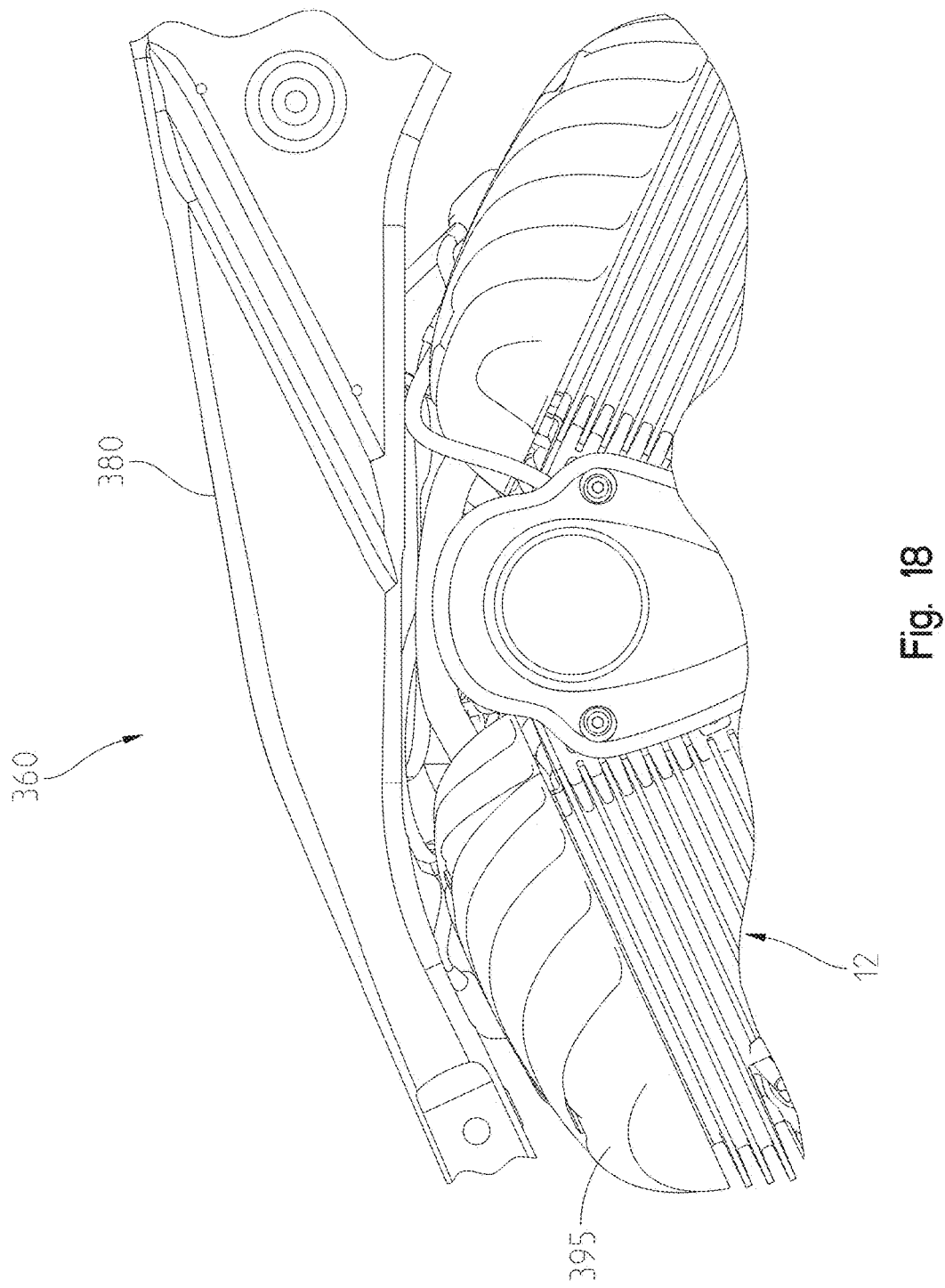
FIG. 18 shows an alternate main frame portion positioned above the twin V-cylinder engine.
Figure 19:
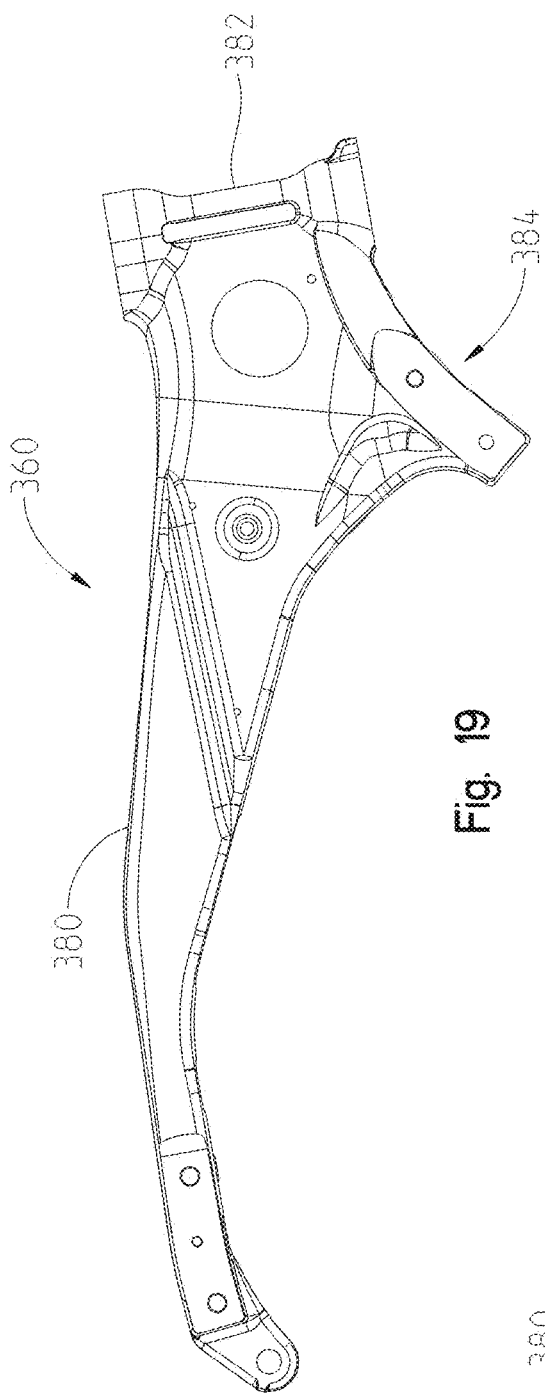
FIG. 19 shows a side plan view of the main frame portion of FIG. 18.
Figure 20:
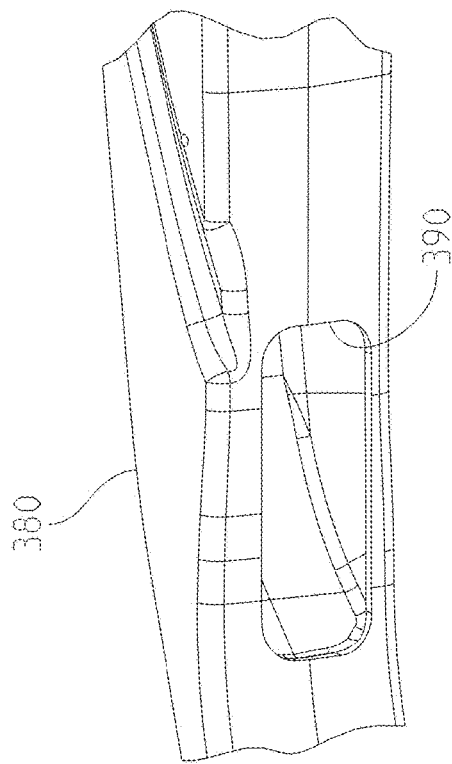
FIG. 20 shows the air outlet of the main frame portion of FIG. 19.

With reference now to FIGS. 18-20, a further embodiment of the vehicle is shown having a main frame portion 360 comprising a body portion 380 having a head tube 382 with an opening 384 similar to openings 84 and 184. In this embodiment, an opening 390 (FIG. 20) is formed through body portion 380 such that the opening opens on to engine 12, and more particularly, towards the rear cylinder 395 of engine 12 as shown best in FIG. 18. Thus in this embodiment, the cooling air is provided to cool the engine whereby the radiation of heat from the engine is lowered keeping the rider's legs at a cooler temperature than without the opening 390.

Figure 22:
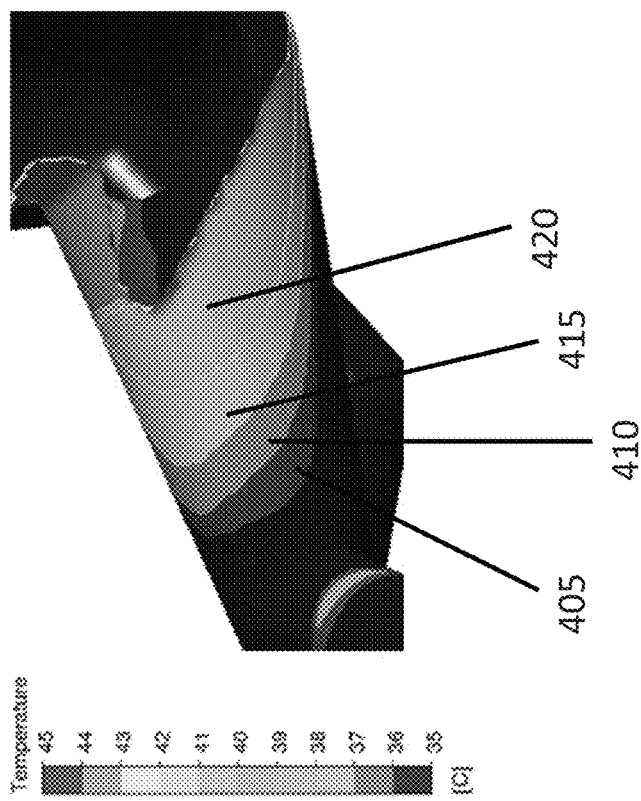
FIG. 22 shows a temperature gradient representation of a riders leg with the embodiment of FIG. 18.
Figure 21:
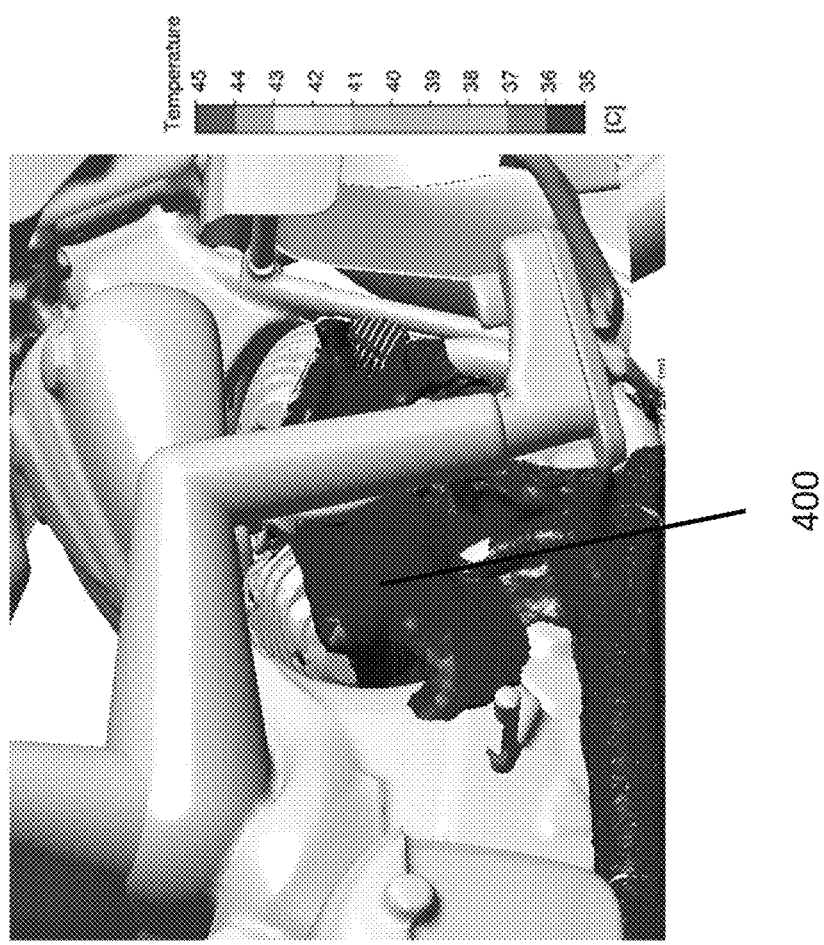
FIG. 21 shows an isosurface depiction of the hot air pocket when the vehicle speed is 1 mph.

The reduction in heat to the rider's legs is shown in the view of FIGS. 21 and 22, wherein FIG. 21, the hot pocket is shown at 400, which is kept away from the rider's leg, and wherein in FIG. 22, the temperature at the rider's thigh is shown in temperature gradients where the maximum temperature gradient is between 38 and 39° C.

More particularly, the temperature gradients are as follows:

Gradient 405=35-36° C.

Gradient 410=36-37° C.

Gradient 415=37-38° C.

Gradient 420=38-39° C.

While the embodiment shown in FIGS. 18-20 is shown without a fan, it is conceivable that such a fan could be used as described in either of the embodiments of FIG. 12 or 16.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising:
a frame;
a plurality of ground-engaging members for supporting the frame;
an engine supported by the frame and operably coupled to the ground-engaging members;
an operator's seat supported by the frame and positioned above the engine;
the frame including a main frame portion having a front opening at a front side thereof, an air duct extending through the main frame portion, and at least one rear air opening at a rear side thereof, whereby air is moved through the front and rear openings configured to cool the operator, wherein the at least one rear opening directs air laterally outwardly to exhaust air from the duct onto the operator's legs.

2. A two-wheeled vehicle, comprising:
a frame;
a plurality of ground-engaging members for supporting the frame;
an engine supported by the frame and operably coupled to the ground-engaging members;
an operator's seat supported by the frame and positioned above the engine;
the frame including a main frame portion having a front opening at a front side thereof, an air duct extending through the main frame portion, and at least one rear air opening at a rear side thereof, whereby air is moved through the front and rear openings to cool the operator, wherein the at least one rear opening opens downwardly onto a top of the engine.

3. The two-wheeled vehicle of claim 1, wherein the at least one rear opening comprises two air outlets which open laterally outwardly to exhaust air from the duct onto the operator's legs.

4. The two-wheeled vehicle of claim 3, wherein the main frame portion extends rearwardly to a position where the two air outlets extend to a position under a front of the seat.

5. The two-wheeled vehicle of claim 1, wherein the front opening of the main frame portion opens forwardly and is unobstructed to provide a ram air effect through the front opening while the vehicle is moving.

6. The two-wheeled vehicle of claim 1, further comprising a fan mounted internally of the duct to draw air into and through the duct.

7. A two-wheeled vehicle, comprising:
a frame;
a plurality of ground-engaging members for supporting the frame;
an engine supported by the frame and operably coupled to the ground-engaging members;
an operator's seat supported by the frame and positioned above the engine;
the frame including a main frame portion having a front opening at a front side thereof, an air duct extending through the main frame portion, at least one rear air opening at a rear side thereof, whereby air is moved through the front and rear openings to cool the operator, and a fan mounted internally of the duct to draw air into and through the duct, wherein the fan is bi-directional and can pull air through the duct from front to rear or rear to front.

8. The two-wheeled vehicle of claim 7, wherein the bi-directional fan is operated based on vehicle speed.

9. The two-wheeled vehicle of claim 8, wherein when the vehicle speed is less than a vehicle speed V1 miles per hour (mph), the fan is operated to pull air through the duct from the rear to front.

10. The two-wheeled vehicle of claim 8, wherein when the vehicle speed is greater than V1 but less than a vehicle speed V2 miles per hour (mph), the fan is operated to pull air through the duct from the front to rear at a first fan speed.

11. The two-wheeled vehicle of claim 10, wherein when the vehicle speed is greater than V2, the fan is operated to pull air through the duct from the front to rear at a second fan speed, where the second fan speed is greater than the first fan speed.

12. The two-wheeled vehicle of claim 9, wherein the vehicle speed V1 is approximately 10 mph.

13. The two-wheeled vehicle of claim 10, wherein the vehicle speed V2 is in a range between 15-35 mph.

14. The two-wheeled vehicle of claim 13, wherein the vehicle speed V2 is in a range between 20-30 mph.

15. The two-wheeled vehicle of claim 6, wherein the fan is operated based on at least one temperature point around the vehicle.

16. The two-wheeled vehicle of claim 6, wherein the fan is operated based on at least one of the operating conditions related to the ambient temperature, the oil temperature or the transmission gear.

* * * * *